United States Patent [19]
Anderson

[11] 3,790,207
[45] Feb. 5, 1974

[54] COMBINATION ROOF AND SIDEWALL EXTENSIONS FOR VEHICULAR HAULING BEDS

[76] Inventor: Dennis Anderson, Box 252, Rt. 1, Barnum, Minn. 55707

[22] Filed: Mar. 15, 1972

[21] Appl. No.: 234,700

[52] U.S. Cl. .............................. 296/23 G, 52/66
[51] Int. Cl. ............................................ B60p 3/34
[58] Field of Search. 296/23 H, 23 G, 23 F, 23 MC, 296/23 R; 52/66, 70, 71, 68, 69

[56] References Cited
UNITED STATES PATENTS

| | | | |
|---|---|---|---|
| 3,145,044 | 8/1964 | Harrison et al. | 296/23 MC |
| 3,556,581 | 1/1971 | Silva | 296/23 G |
| 3,280,796 | 10/1966 | Hatcher | 52/70 |
| 1,881,482 | 10/1932 | Gilkison | 296/23 R |
| 2,788,238 | 4/1957 | Baird | 296/23 R |
| 3,508,781 | 4/1970 | Anderson | 296/23 MC |
| 2,640,721 | 6/1953 | Kors | 296/23 H |

*Primary Examiner*—Philip Goodman
*Assistant Examiner*—John A. Carroll
*Attorney, Agent, or Firm*—Robert Brown, Jr.

[57] ABSTRACT

A collapsible vehicular hauling bed construction wherein a pair of panels are respectively hinged along parallel axes to two opposed sidewalls of a rectangular truck bed and swingable inwardly to inclined abutting positions to form an inverted U-shaped roof, and swingable outwardly to upright positions to form extensions of the opposed sidewalls, in combination with a third panel hinged along a third axis normal to at least one of the two first-named axes, said third panel adapted to rotate between a collapsed position beneath the abutting roof panels and an upright position forming an extension of one of the remaining bed sidewalls, and means for releasably connecting the upright third panel between said upright pair of panels to thereby form a continuous wall extension for three sidewalls of the hauling bed.

4 Claims, 18 Drawing Figures

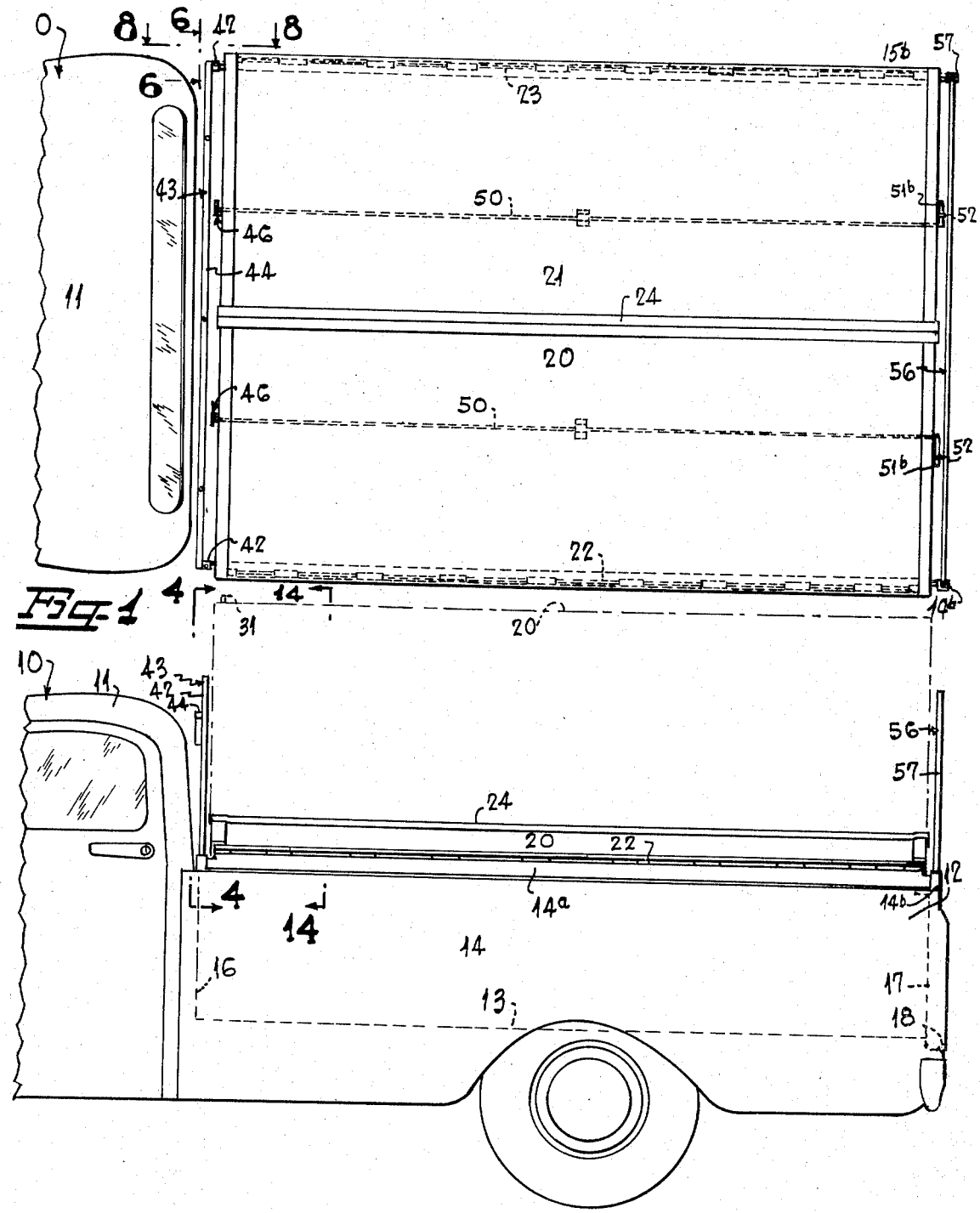

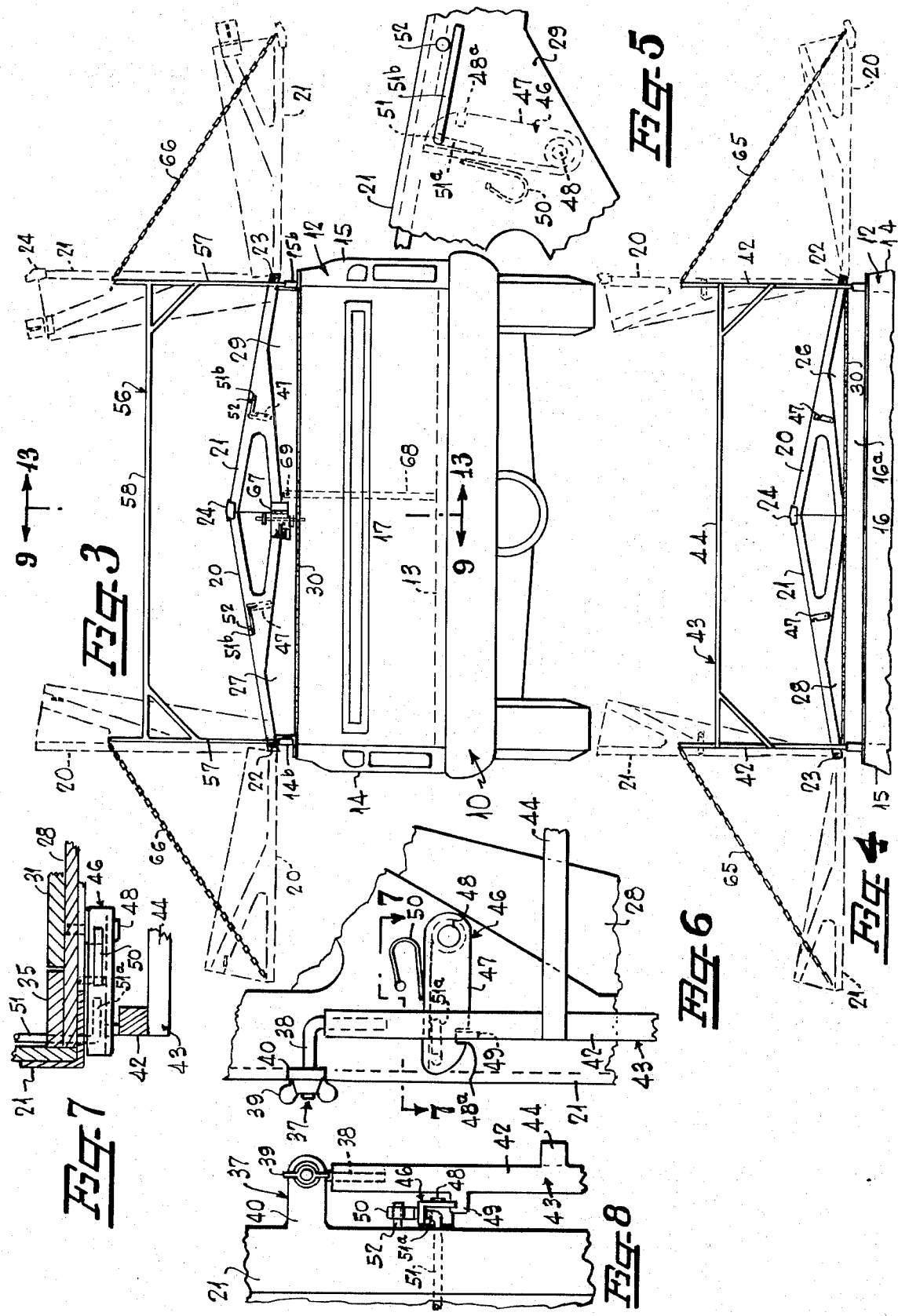

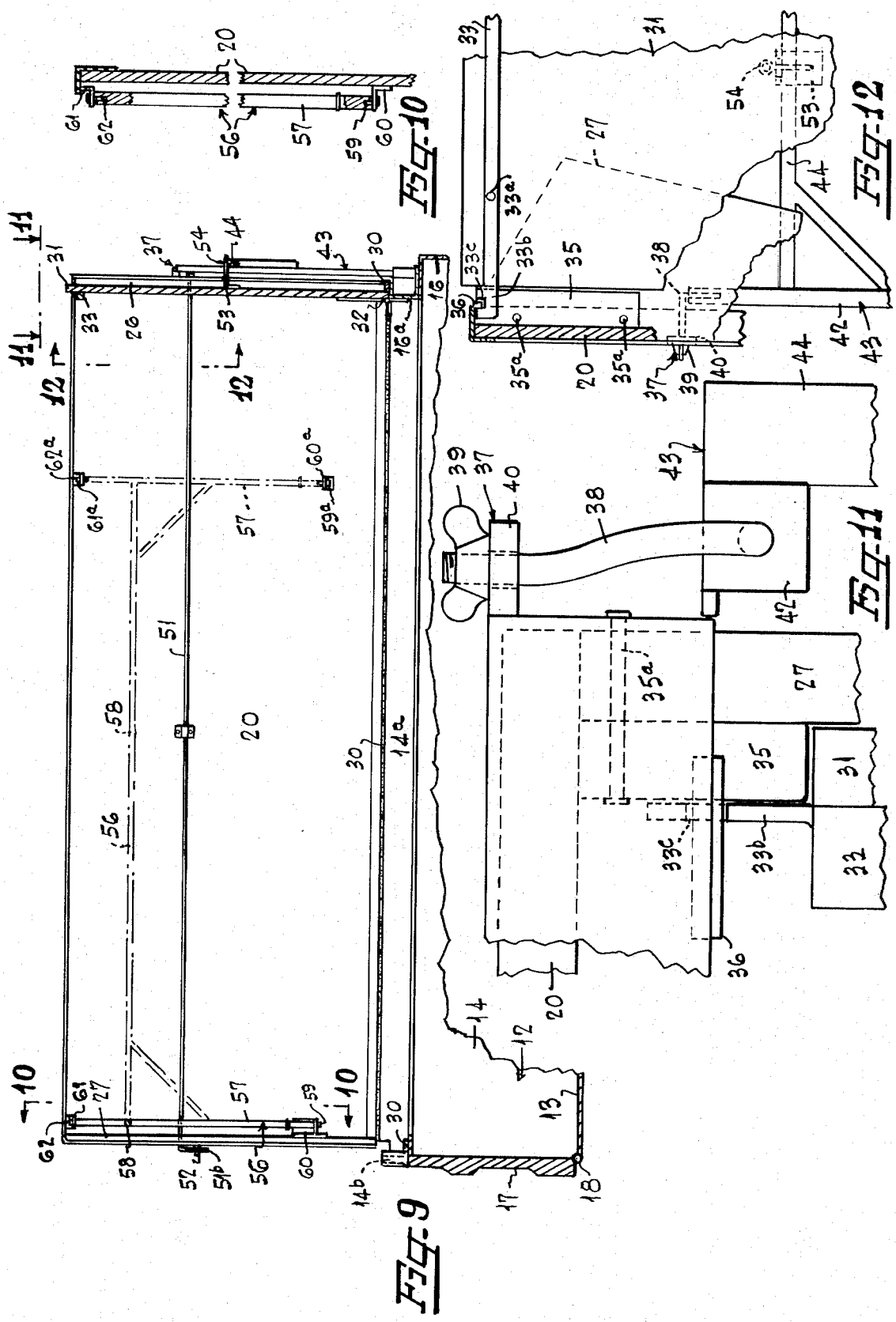

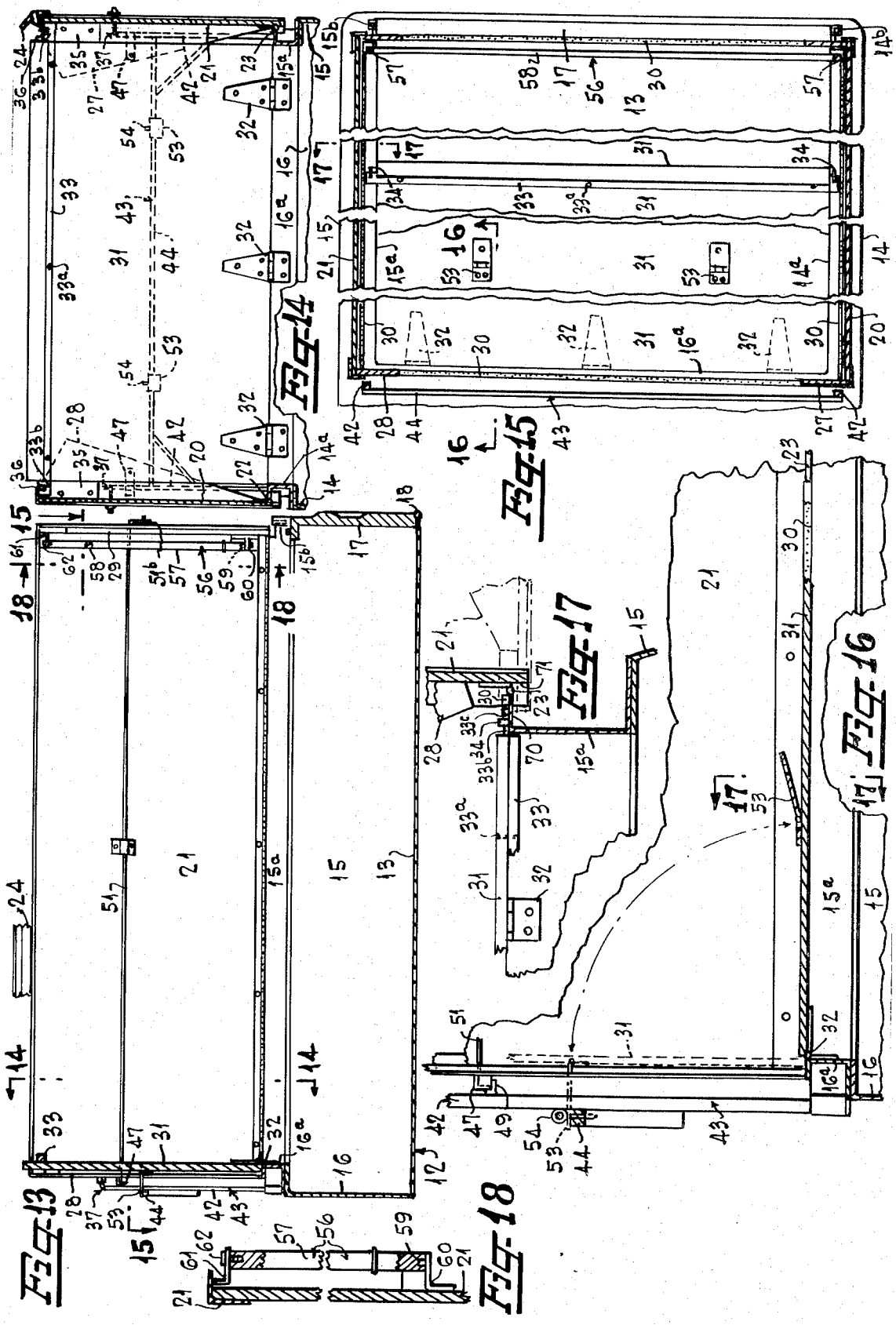

COMBINATION ROOF AND SIDEWALL EXTENSIONS FOR VEHICULAR HAULING BEDS

This invention relates to the body construction of automotive vehicles such as trucks, trailers and the like, and more especially to a multiple purpose hauling bed adapted for use under varying loading conditions.

It is therefore an object of this invention to provide a vehicular hauling bed so constructed and arranged that its parts may be easily and quickly repositioned to accommodate different hauling and storing requirements of the user. The invention is especially useful by workmen who are required to transport tools and equipment to and from numerous job sites, or by farmers and laborers having varied transportation requirements ranging from light-weight grocery shopping to hauling heavy commodities such as cattle and grain.

It is another object of this invention to provide a rectangular hauling bed wherein a pair of pivoted panels serves the dual purpose as a roof and as upright extensions of the side walls of the bed, and wherein a third pivoted panel serves a second dual purpose as an upright extension for an end sidewall of the bed and as a spacer for the two first-named panels.

It is yet another object of this invention to provide an article of the class described which is low in manufacturing costs, simple in construction, durable and easily maintained, and adapted to be converted into a plurality of load-supporting shapes to accommodate a wide variety of hauling conditions. Due to the simplicity in construction, the unit can be produced at a relatively fast rate thereby minimizing the production costs.

Some of the objects of invention having been stated, other objects will appear as the description proceeds when taken in connection with the accompanying drawings, in which:

FIG. 1 is a top plan view of a combination roof and sidewall extension assembly for vehicular hauling beds according to my invention;

FIG. 2 is a side elevation of FIG. 1, showing in bold lines the assembly panels in collapsed position and showing in dot-dash lines the panels in upright positions;

FIG. 3 is a rear elevation looking at the right-hand end of FIG. 3, showing in dot-dash lines two other operative positions of the panels;

FIG. 4 is a front elevation similar to FIG. 3 and taken along line 4—4 in FIG. 1;

FIG. 5 is an enlarged detail view of the right-hand central portion of FIG. 3, showing roof panel 21 in lowered position and with the latch assembly 46 unlatched;

FIG. 6 is an enlarged detail view taken along line 6—6 in FIG. 1, but showing the roof panel 21 in upright latched position;

FIG. 7 is a sectional plan view taken along line 7—7 in FIG. 6;

FIG. 8 is an enlarged elevation looking along line 8—8 in FIG. 1 and also looking at the left-hand side of FIG. 6;

FIG. 9 is a longitudinal sectional view taken along line 9—9 in FIG. 3, but showing the combination roof-sidewall panel 20 in upright position;

FIG. 10 is a sectional detail view taken along line 10—10 in FIG. 9;

FIG. 11 is an enlarged plan view taken along line 11—11 in FIG. 9;

FIG. 12 is a sectional detail view taken along line 12—12 in FIG. 9;

FIG. 13 is a longitudinal sectional view taken along line 13—13 in FIG. 3, but showing the combination roof-sidewall panel 20 in upright position;

FIG. 14 is a transverse sectional view taken along lines 14—14 in FIGS. 2 and 13;

FIG. 15 is a fragmentary sectional plan view taken along line 15—15 in FIG. 13, but showing the opposed combination roof-sidewall panels 20 and 21 in upright positions, and with the end panel 31 in lowered horizontal position;

FIG. 16 is an enlarged sectional detail view taken along line 16—16 in FIG. 15;

FIG. 17 is an enlarged sectional detail view taken along line 17—17 in FIG. 16, and FIG. 18 is an enlarged sectional detail view taken along line 18—18 in FIG. 13.

Referring more particularly to the drawings, the numeral 10 denotes a pick-up automotive truck having a cab 11 and a rectangular hauling bed 12. The bed includes a floor 13, longitudinal sidewalls 14 and 15, front side or end wall 16, and tail gate or rear end wall 17, said tailgate being pivotally secured as at 18 and adapted to swing rearwardly and downwardly in a conventional manner.

Sidewalls 14, 15 and 16 of the truck bed have mounted thereon a U-shaped frame composed of channel segments 14a, 15a and 16a. These segments slightly increase the height of the respective side walls 14, 15 and 16 and, therefore, form integral portions of the latter. The primary function of these segments, however, is to adapt applicant's construction to conventional truck beds.

The hauling bed 12 is adapted to be covered by inclined roof panel sections 20 and 21 which are respectively hinged as at 22 and 23 to the upper flanges of the segments 14a and 15a. The free ends of sections 20 and 21 are adapted to abut one another when in closed position to form a roof over the hauling bed 12, said free ends forming the roof apex and being covered by a cap strip 24. It will be observed in FIGS. 3 and 4 that panel sections 20 and 21 may be rotated about hinges 22 and 23 to dot-dash upright positions to serve as extensions of the bed side walls 14, 14a and 15, 15a respectively; and also may be rotated farther to horizontally extending dot-dash positions to serve as elevated lateral extensions of the bed floor 13.

Panel section 20 has vertically disposed half-gables 26 and 27 at its front and back ends. Similarly, panel section 21 has vertically disposed half-gables 28 and 29. When the panels 20 and 21 are in roof positions, the half-gables 26 and 28 abut one another to form a full front gable (FIG. 4) while the free ends of half-gables 27 and 29 abut and form a full rear gable as shown in FIG. 3.

It will be noted in FIG. 4 that the lower edges of half-gables 26 and 28 rest upon a weather strip 30 which, in turn, rests upon frame segment 16a. Similarly in FIG. 3, half-gables 27 and 29 are supported by weather strip 30 and tailgate 17. Weather strip 30 also extends along the upper sides of channel segments 14a and 15a to seal the remaining sides of the truck bed 12 when the roof sections 20 and 21 are closed.

In order to space the front ends of panel sections 20 and 21 apart when in upright positions, and further to form an upright extension for the front wall 16, 16a of the hauling bed 12, a third panel 31 is hinged as at 32 to the frame segment 16a. As will be observed in FIGS. 11, 12 and 14, each half-gable 26 and 28 has secured thereto a spacer block 35 by any suitable means such as bolts 35a, the proximate edges of these blocks being adapted to abut the opposite upper edges of upright panel 31. Panels 20, 21 and 31 are securely held in abutting positions by means of corner anchors 37 and latch assemblies 46 which will be described later.

The free end portion of panel 31 has a transversely disposed strut or spacer bar 33 attached thereto by any suitable means such as bolts 33a, said bar having oppositely extending end plates 33b with notches 33c therein respectively (FIGS. 11 and 12). When panel 31 and sections 20 and 21 are in upright positions as shown in FIGS. 11, 12 and 14, the notches 33c releasably engage bars 36, 36 on the upper free ends of panel sections 20 and 21 respectively to thereby provide another pair of front corner connections which cooperate with the above-mentioned anchors 37, 37 and latch assemblies 46, 46. When the panel 31 is rotated to the horizontal position shown in FIGS. 15, 16 and 17, the notches 33c, 33c releasably engage projections 34, 34 integral with the top flanges of the oppositely disposed sidewall channel segments 14a, 15a respectively, thereby stabilizing the panel against lateral movement relative to the segments when the panel is in collapsed position.

Each connection 37 consists of an L-shaped bolt 38, a wing nut 39 and a lug 40 (FIGS. 4, 11, 12 and 14). A lug 40 is integral with each of the panels 20 and 21 and an L-shaped bolt 38 is mounted in an upright 42 of a front anchor frame 43 supported by the front corners of the truck bed 12, thereby individually connecting the panels 20 and 21 to the anchor frame. Frame 43 is provided with a horizontal strut 44 connected between uprights 42, said strut being releasably secured to upright panel 31 by means of hasps 53 and pins 54 (FIG. 13 and 16).

The panel sections 20 and 21 are also individually and releasably held in upright positions by means of latch assemblies 46, 46. The assembly 46 associated with section 21 (FIGS 6 and 8) comprises a latch bar 47 having one end thereof pivotally secured to the front half-gable 28 as at 48, said latch bar having a notch 48a in its free end for releasably engaging a lug 49 on upright post 42. A spring 50 yieldingly holds the bar 47 in engagement with said lug, The assembly 46 associated with panel section 20 is opposite hand to the one associated with section 21.

Since the latching assemblies 46 are located adjacent the back of the cab 11 and not conveniently accessible, means located at the rear of the truck bed for manually and individually releasing each assembly. This release mechanism consists of a rod 51 rotatably mounted in the half-gables of the respective panel sections 20 and 21 (FIGS. 6, 8, 9 and 13), the front end of said rod having an L-shaped bent end 51a positioned beneath the free end of latch bar 47, and the rear end of the bar having a second L-shaped handle (FIG. 3). The spring 50 of each assembly 46 yieldingly presses the free end of latch bar 47 against the free rod end 51a which, in turn, tends to rotate rod 51 to cause the rear end or handle 51b to yieldingly engage a stop 52 on the associated panel section. Thus, by first releasing the above-described connections 33b, 33c and assemblies 37, the latch assemblies 46 constitute the sole supporting means for each of the panel sections 20 and 21 so that the latter sections may be rotated either to roof positions or to outwardly extending horizontal positions (FIGS. 3 and 4).

Moreover, when the assemblies 46 are releasably latched the front corners of the upwardly extending side walls 20, 21 and 31 may be further releasably secured by either or both of the connections 37 and 33b, 36.

The individual holding or connecting means 37 and 53, 54 are also releasably interconnected to form corner braces between the upright panels 20, 21 and 31 at the front of the truck bed. More specifically, the frame 43 serves as a common anchor for hinges 53 of panel 31 as well as for the assembly 46 thereby rigidly connecting the panels, but permitting each panel to be individually disconnected.

The rear ends of panel sections 20 and 21 are releasably held in upright positions (FIGS. 9, 13 and 15) by a removable anchor frame or strut 56 positioned above tailgate 17. The strut 56 is composed of a pair of parallel uprights 57 and a transverse bar 58, said strut being adapted to occupy three positions, namely, at right angles to sections 20 and 21 (FIG. 15), in a stored position attached to panel section 20 as shown in dot-dash lines in FIG. 9, and in an exterior position with posts or uprights 57 fitting in pockets 14b and 15b (FIGS. 3, 9 and 15). In the last-named position, the horizontal bar 58 cooperates with horizontal bar 44 of the front frame assembly 43 to supporting elongated members such as pipes and structural elements during transportation. When strut 56 is in the right angular position shown in FIG. 15, the lower ends of parallel uprights 57 fit between lower and upper brackets 60 and 61 on the interior of each of panels 20 and 21, the lower bracket 62 having dowel pin 59 fitting into the lower end of the upright, and the upper end of the upright being releasably secured to upper bracket 61 by stud screw 62 (FIGS. 9, 13 and 18).

The removal of the screw in panel section 21 (FIG. 13) permits detachment of this end of strut 56 from the section so that it may be rotated about its opposite end through an angle of approximately 90° and to the dot-dash line position shown in FIG. 9 for storage. In this stored position, the strut 56 is held adjacent the inner surface of panel section 20 by brackets 60, 60a, 61, 61a, dowels 59, 59a and screws 62, 62a.

When it is desired to lower the panel sections 20 and 21 from the upright positions abutting upright front end panel 31 and upright rear strut 56, the strut 56 is first removed or repositioned, then the front panel 31 is disconnected from anchor frame 43 and rotated to horizontal position (FIG. 16), then assemblies 37, 37 are disconnected from anchor frame 43, leaving the panel sections secured in upright positions by the latch assemblies 46. Finally, handles 51b at the rear of the truck bed may be individually rotated to lower its associated roof panel.

When the strut 56 is positioned in pockets 14a and 15a as previously described, it further serves to support the panels 20 and 21 in outstanding positions by means of chains 65, 65 (FIG. 4). Similarly, the front frame 43 supports outstanding panel sections 20 and 21 by means of chains 66 (FIG. 3).

If desired, a lock assembly 67 may be provided to prevent unauthorized access to the covered hauling bed (FIG. 3).

Should the tailgate 17 be lowered while the panel sections are in roof positions, a supplementary support for the rear end of the abutting panel sections is preferably provided, said support consisting of a post 68 having its upper end pivoted to half-gable 29 and its lower end resting upon floor 13 of the truck bed.

In FIG. 17, it will be observed that panel 21 is hinged intermediate its ends along its inside face to the outer edge of outstanding flange 70 at the top of bed sidewall 15, 15a to thereby permit the panel edge portion 71 to rotate to the dot-dash line position and extend inwardly beneath the flange when the panel is in outwardly extending horizontal position.

I claim:

1. A combination roof and wall extension assembly for vehicular hauling beds (12) having a floor (13), a pair of oppositely disposed sidewalls (14, 14a, 15, 15a), and at least one end wall (16), comprising:
   a. a pair of panels (20, 21) forming a roof cover over said bed;
   b. means (22) for hingedly securing a marginal edge portion of one of said panels (20) upon one of said sidewalls (14, 14a);
   c. means (23) for hingedly securing a marginal edge portion of the other of said panels (21) upon the other of said sidewalls (15, 15a), said panels being swingable about their respective hinge means to and from said roof covering positions and positions forming upright extensions of their associated sidewalls;
   d. a third panel (31) having one edge portion thereof hingedly secured upon said end wall (16) and rotatable between a position overlying said floor (13) and a position forming an upright extension of the associated wall;
   e. an anchor frame (43) disposed adjacent the outside face of said third panel when the latter is in upright position;
   f. means (46) for releasably latching each of said first and second panels (20, 21) in its upright position and to said anchor frame;
   g. means (33b, 33c, 36) independent of said latch means and operable upon rotation of said third panel (31) to its upright position for laterally holding the free end portions of said upright first and second panels in spaced relation; and
   h. means (43, 53, 54) for releasably securing said third panel (31) in its upright position.

2. The combination as defined in claim 1 wherein said releasable latch means (46) is mounted at one end of each of said first and second panels (20, 21), and further comprising means (51b) at the other end of each of the last-named panels for manually operating said latch means.

3. The combination as defined in claim 1 and further comprising vertically releasable means (33, 33b, 33c, 34) for securing the free end of said third panel against lateral movement relative to said oppositely disposed sidewalls (14, 14a, 15, 15a) when the panel is in its overlying position.

4. The combination as defined in claim 2 and further comprising vertically releasable means (33, 33b, 33c, 34) for securing the free end of said third panel against lateral movement relative to said oppositely disposed sidewalls (14, 14a, 15, 15a) when the panel is in its overlying position.

* * * * *